UNITED STATES PATENT OFFICE.

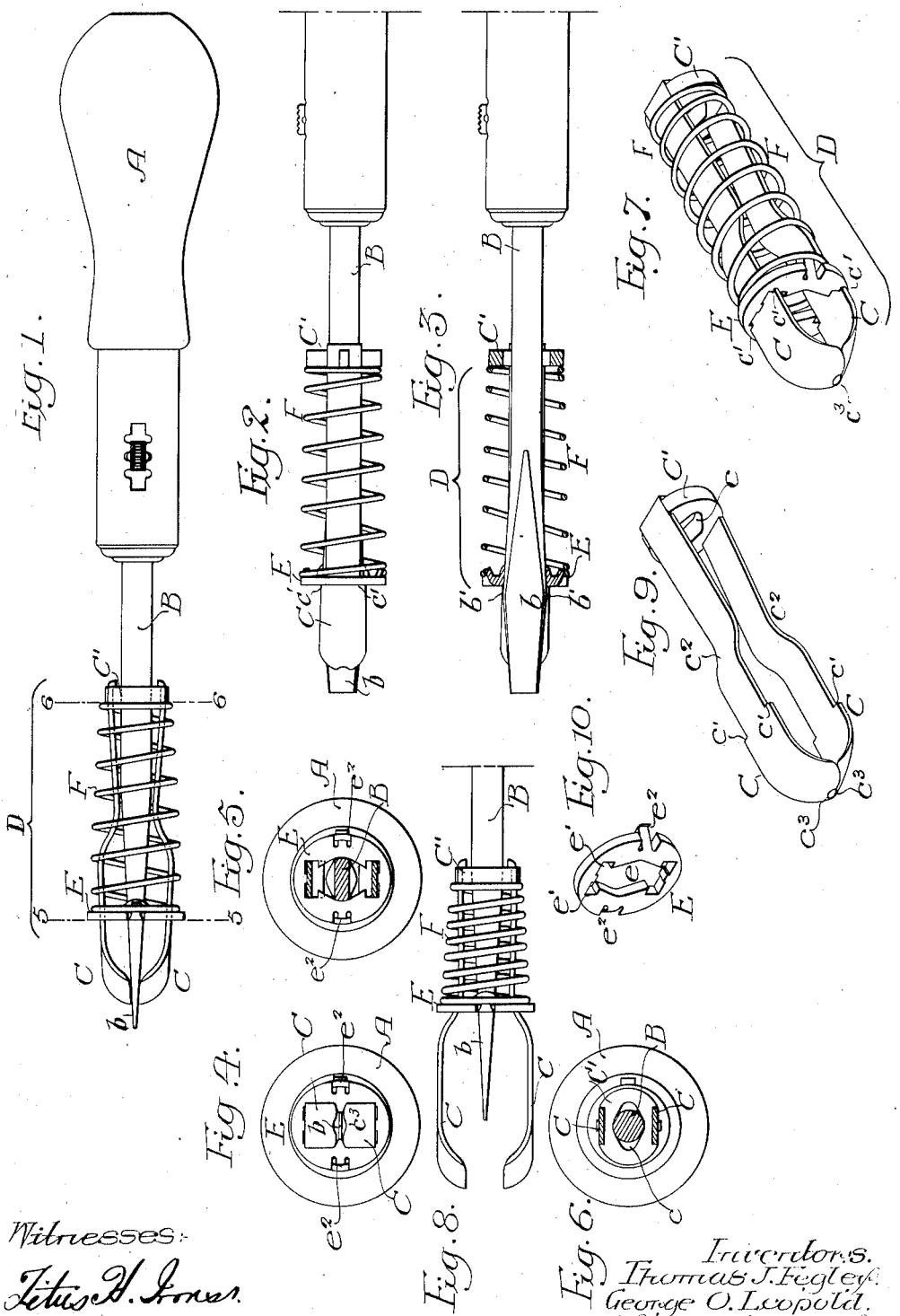

THOMAS J. FEGLEY AND GEORGE O. LEOPOLD, OF PHILADELPHIA, PENNSYLVANIA, ASSIGNORS TO NORTH BRO'S. M'F'G. CO., OF PHILADELPHIA. PENNSYLVANIA, A CORPORATION OF PENNSYLVANIA.

SCREW-HOLDER FOR DRIVERS.

No. 864,633.  Specification of Letters Patent.  Patented Aug. 27, 1907.

Application filed March 4, 1907. Serial No. 360,477.

*To all whom it may concern:*

Be it known that we, THOMAS J. FEGLEY and GEORGE O. LEOPOLD, citizens of the United States, residing in Philadelphia, Pennsylvania, have invented certain Improvements in Screw-Holders for Drivers, of which the following is a specification.

The object of our invention is to simplify the construction of a screw holder and so design it that it can be operated by one hand.

In the accompanying drawings: Figure 1, is a plan view of a screw driver, showing our improved screw holding attachment in place; Fig. 2, is a side view; Fig. 3, is a view similar to Fig. 2, with the screw holding attachment in section; Fig. 4, is an end view; Fig. 5, is a section on the line 5—5, Fig. 1; Fig. 6, is a section on the line 6—6, Fig. 1; Fig. 7, is an end view showing the screw holding attachment detached from the screw driver; Fig. 8, is a view showing the attachment in position on the driver, with the spring compressed and the jaws opened ready to receive a screw, and Figs. 9 and 10, are detail perspective views of parts of the driver.

A is the handle of a screw driver and B is the shank having the ordinary flat tapered blade $b$. We have shown what is termed a ratchet screw driver, but any type of screw driver may be used without departing from our invention.

D is the screw holding attachment, which can be applied to the shank B of the screw driver, as clearly shown in Fig. 1. This attachment has two jaws C—C, which are attached to a head $C'$ having an opening $c$ for the free passage of the shank of the screw driver. The opening is elongated, as shown in Fig. 6, so that the flattened blade $b$ will readily pass through it.

Mounted on the jaws is a disk E, clearly shown in Fig. 10, which has an elongated opening $e$ terminating in lateral recesses $e'$ into which the edges of the jaws C—C extend so that the jaws are controlled by this sleeve. The elongated opening $e$ is of such a length that the wide portion $b'$ of the blade $b$, Fig. 3, will readily pass through it, but the opening $e$ is so narrow that when the blade is turned at right angles, after it is inserted in the screw holder, the disk E will rest upon the shoulder $b'$ as shown in Fig. 3, preventing it from becoming detached from the blade; and thus it forms an abutment. Between this abutment disk E and the head $C'$ is mounted a coiled spring F, which forces the head away from the disk and consequently draws the jaws C—C through the disk.

It will be noticed on referring to the Figs. 7 and 9, that the inward movement of the jaws is stopped by the shoulders $c'$ and the jaws are curved at $c^2$ in such a manner that when the head $C'$ is pushed forward for instance to the position shown in Fig. 8—the jaws are forced apart as they must travel in the notched portions $e'$ of the disk E and when in this position a screw head can be inserted between the jaws and after releasing the jaws they will immediately grasp the screw and draw it against the end of the blade $b$ and by turning the blade it will find the slot in the screw and when it enters the slot the screw will be held rigidly in position.

The ends of the jaws C—C are notched at $c^3$ so as to center the shank of the screw, holding it more rigidly than if the jaws were simply straight. The spring is held to the disk E, in the present instance, by means of lugs $e^2$ struck from the disk, as shown in Fig. 10.

It will be understood that the spring may be attached to the disk in any manner without departing from the essential features of the invention.

The operation of the device is as follows: If it is desired to use a screw driver in a place where it is inconvenient to use two hands, this device can be readily applied to the screw driver by simply pushing it onto the shank B past the blade and turning it at right angles so that the narrow portion of the opening $e$ in the disk E will bear against the wide portion $b'$ of the blade. This wide portion of the blade will hold the disk rigidly, so that by simply pushing upon the head $C'$ with the hand that holds the screw driver the jaws will open and a screw can be placed in the jaws by the other hand and on releasing the pressure the jaws will recede by the action of the spring, holding the screw directly under the head and drawing the screw towards the ends of the blade and on turning this blade it will find the slot in the screw. The screw will then be in position to be driven in the ordinary manner.

The taper of the ends of the jaws is sufficient to cause the jaws to separate and release the head of the screw after it is driven nearly the full distance into the material, but it will, of course, be understood that by pressing upon the head $C'$ the jaws can be quickly removed from the screw and the screw driver can then drive the screw entirely home.

We claim:—

1. The combination in a screw holding attachment for screw drivers, of two jaws, a head to which the jaws are attached, an abutment disk having guides for the jaws, said jaws being shaped so as to be moved apart when the head is moved towards the disk, and a spring for separating the head from the disk, substantially as described.

2. The combination in a screw holding attachment for screw drivers, of two jaws, a head to which the jaws are attached, an abutment disk slotted to allow for the passage of the jaws, said jaws being shaped so that when the head is moved towards the disk they will be separated and when moved away from the disk they will be drawn together, with a spring tending to force the head away from the disk, both the head and the disk being perforated for the passage of the shank of the screw driver, and the disk being so shaped as to engage the wide portion of the shank, substantially as described.

3. The combination of a screw driver having a shank, with a flattened and enlarged blade, a screw holding attachment consisting of two jaws, a head to which the jaws are attached, and a disk through which the jaws pass and by which they are guided, said head and disk having elongated openings for the passage of the shank of the screw driver, the opening in the disk being so proportioned that when turned after the screw is inserted it will rest upon the enlarged portion of the blade of the driver, substantially as described.

4. The combination of a screw driver having a shank and a flat blade, the blade having a wide portion, a screw holding attachment consisting of two jaws and a head to which the jaws are attached, a disk through which the jaws pass, and a spring mounted between the disk and the head having an elongated opening for the passage of the shank of the screw driver, the disk having an elongated opening notched at the corners to form passages for the jaws, the width of the said opening in the jaws being less than the width of the blade of the driver so that when the screw driver is passed into the screw holder and turned at a half revolution it will engage the disk and hold it against outward movement so that pressure can be applied to the head to compress the spring and open the jaws, the head being guided by the shank portion of the screw driver, substantially as described.

5. The combination of a screw driver, a disk attached to the blade of the screw driver near the end, a head adapted to slide on the shank of the screw driver, a spring mounted to act between the head and the disk, two jaws attached to the head and extending through the disk, the jaws being shaped so that when the head is forced against the pressure of the spring towards the disk the jaws will be opened so that they can engage a screw, substantially as described.

In testimony whereof, we have signed our names to this specification, in the presence of two subscribing witnesses.

THOMAS J. FEGLEY.
GEORGE O. LEOPOLD.

Witnesses:
  JOS. H. KLEIN,
  WM. A. BARR.